(12) United States Patent
Hsieh

(10) Patent No.: US 9,134,829 B2
(45) Date of Patent: Sep. 15, 2015

(54) ELECTRONIC DEVICE AND METHOD FOR UNLOCKING ELECTRONIC DEVICE

(75) Inventor: Hsing-Chun Hsieh, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 350 days.

(21) Appl. No.: 13/564,769

(22) Filed: Aug. 2, 2012

(65) Prior Publication Data

US 2013/0169553 A1   Jul. 4, 2013

(30) Foreign Application Priority Data

Dec. 28, 2011   (TW) .............................. 100149083 A

(51) Int. Cl.
*G06F 3/041* (2006.01)
*G06F 1/16* (2006.01)
*G06F 3/0488* (2013.01)
*G06F 21/31* (2013.01)
*G06F 21/36* (2013.01)
*H04M 1/67* (2006.01)

(52) U.S. Cl.
CPC .............. *G06F 3/041* (2013.01); *G06F 1/1626* (2013.01); *G06F 1/1643* (2013.01); *G06F 1/1647* (2013.01); *G06F 3/04883* (2013.01); *G06F 21/31* (2013.01); *G06F 21/36* (2013.01); *H04M 1/67* (2013.01); *H04M 2250/22* (2013.01)

(58) Field of Classification Search
CPC ...................................................... G06F 3/041
See application file for complete search history.

(56) References Cited

U.S. PATENT DOCUMENTS 8,810,524 B1 * 8/2014 Rosenberg et al. ........... 345/173
2013/0086673 A1 * 4/2013 Putterman et al. .............. 726/19

\* cited by examiner

*Primary Examiner* — Tony N Ngo
(74) *Attorney, Agent, or Firm* — Novak Druce Connolly Bove + Quigg LLP

(57) ABSTRACT

A method for unlocking an electronic device, touch signals are received on an obverse touch panel and a reverse touch panel of the electronic device. The method determines a first touch number on the obverse touch panel and a second touch number on the reverse touch panel according to the received touch signals, and unlocks the electronic device when the first touch number is equal to a first preset value and the second touch number is equal to a second preset value.

16 Claims, 5 Drawing Sheets

ELECTRONIC DEVICE AND METHOD FOR UNLOCKING ELECTRONIC DEVICE

BACKGROUND

1. Technical Field

Embodiments of the present disclosure relate to electronic device unlocking technology, and particularly to a dual touch-panels electronic device and method for unlocking the electronic device using the dual touch-panels.

2. Description of Related Art

Electronic devices (e.g., a mobile phone) may be unlocked using a slide operation on a touch panel of the electronic devices. However, some kinds of electronic device have two touch panels (i.e., dual touch panels), the current slide operation is performed on a single touch panel to unlock the electronic device. Therefore, a new method for unlocking an electronic device using dual touch panels is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
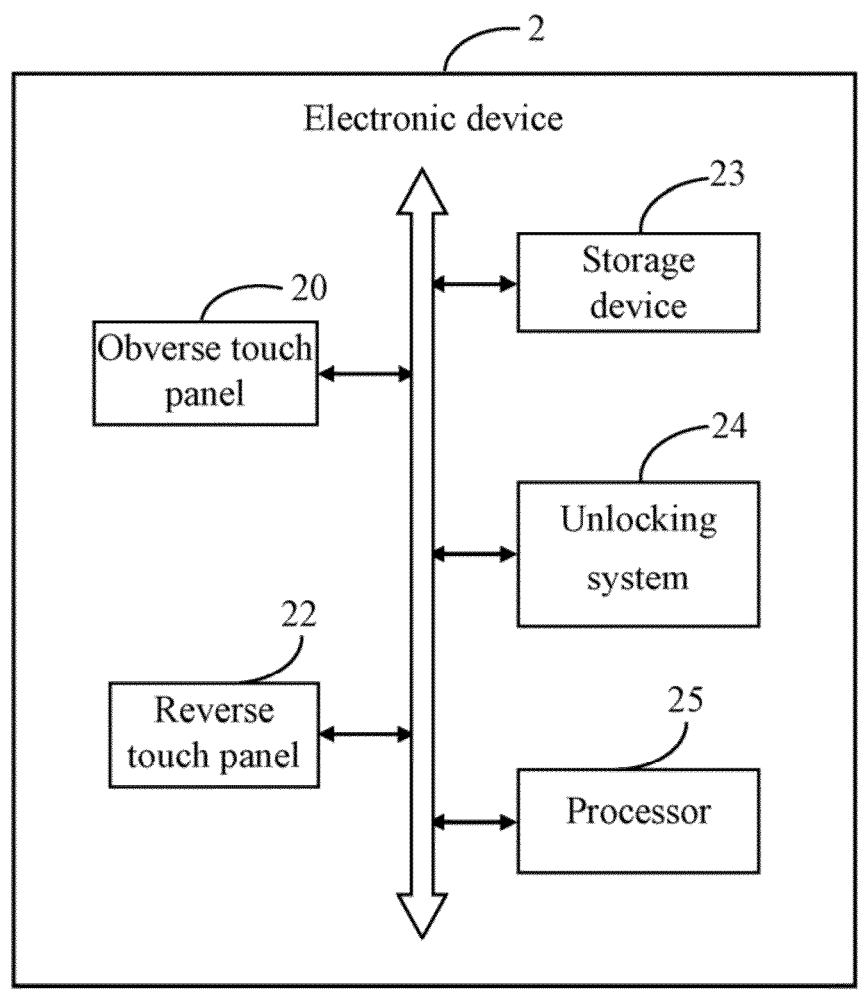
FIG. 1 is a schematic diagram of one embodiment of an electronic device including an unlocking system.

FIG. 1 is a block diagram of one embodiment of an electronic device 2 including an unlocking system 24. The electronic device 2 further includes an obverse touch panel 20, a reverse touch panel 22, a storage device 23, and at least one processor 25. The electronic device 2 may be a smart phone or a personal digital assistant (PDA). It should be understood that FIG. 1 illustrates only one example of the electronic device 2 that may include more or fewer components than illustrated, or have a different configuration of the various components in other embodiments.

The obverse touch panel 20 and the reverse touch panel 22 may be resistive touch panels or capacitive touch panels. The storage device 23 may be a non-volatile computer storage chip that can be electrically erased and reprogrammed, such as a flash memory card.

The unlocking system 24 is used to provide a new unlocking mechanism using the obverse touch panel 20 and the reverse touch panel 22. In one embodiment, the unlocking system 24 may include computerized instructions in the form of one or more programs that are executed by the at least one processor 25 and stored in the storage device 23 (or memory).

A detailed description of the unlocking system 24 will be given in the following paragraphs.

Figure 2:
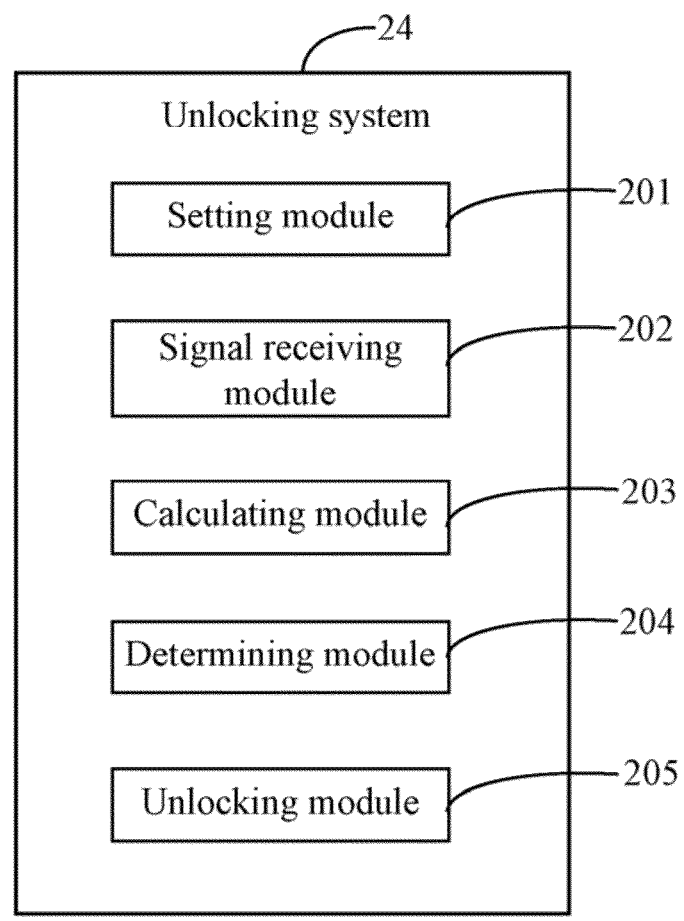
FIG. 2 is a schematic diagram of function modules of the unlocking system included in the electronic device.

FIG. 2 is a block diagram of function modules of the unlocking system 24 included in the electronic device 2. In one embodiment, the unlocking system 24 may include one or more modules, for example, a setting module 201, a signal receiving module 202, a calculating module 203, a determining module 204, and an unlocking module 205. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
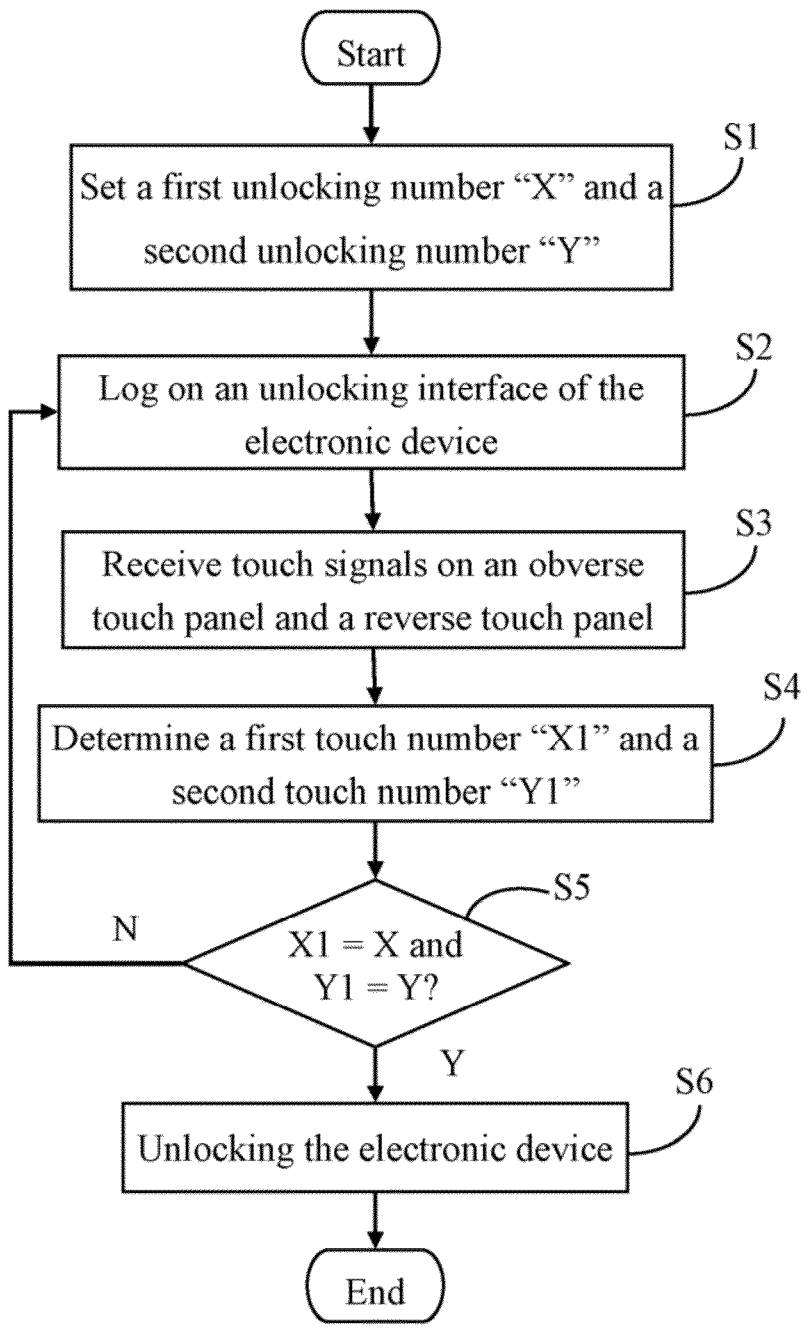
FIG. 3 is a flowchart of one embodiment of a method for unlocking the electronic device.

FIG. 3 is a flowchart of one embodiment of a method for unlocking the electronic device 2. Depending on the embodiment, additional steps may be added, others removed, and the ordering of the steps may be changed.

In step S1, the setting module 201 sets a first unlocking number "X" of touch points on the obverse touch panel 20 and a second unlocking number "Y" of touch points on the reverse touch panel 22 for unlocking the electronic device 2, and stores the first unlocking number "X" and the second unlocking number "Y" in the storage device 23. In one embodiment, the first unlocking number "X" is used to record a number of the touch points on the obverse touch panel 20, and the second unlocking number "Y" is used to record a number of the touch points on the reverse touch panel 22. For example, if two touch points are received from the obverse touch panel 20 (i.e., X=2), and three touch points are received from the reverse touch panel 22 (Y=3), the electronic device 2 is unlocked. In some embodiments, the touch points may be discretional points on the obverse touch panel 20 and the reverse touch panel 22. A detailed description of setting the first unlocking number "X" and the second unlocking number "Y" is as follows.

Figure 4:
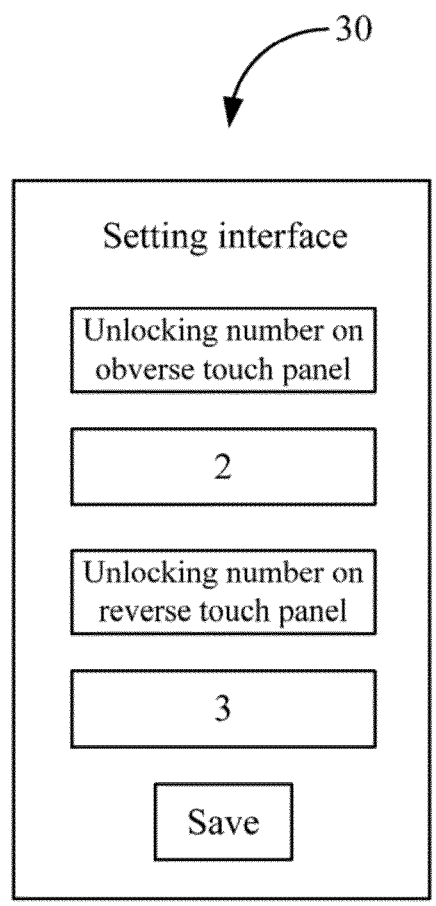
FIG. 4 is a schematic diagram of an example of a user setting interface.

First, the user of the electronic device 2 logs on a setting interface 30 of the electronic device 2 (refers to FIG. 4). Second, the user sets the first unlocking number "X", for example, X=2. Third, the user sets the second unlocking number "Y", for example, Y=3. Fourth, the setting module 201 stores the first unlocking number "X" and the second unlocking number "Y" in the storage device 23 when the user clicks or presses a "Save" button on the setting interface 30.

In one embodiment, a maximum value of the first unlocking number "X" is equal to a number of the maximum touch points of the obverse touch panel 20, and a maximum value of the second unlocking number "Y" is equal to a number of the maximum touch points of the reverse touch panel 22.

It should be noted that in other embodiments, the first unlocking number "X" and the second unlocking number "Y" may be fixed and unchangeable. That is to say, step 1 can be removed in this situation.

In step S2, the user logs on an unlocking interface of the electronic device 2, and performs touch operation on the obverse touch panel 20 and the reverse touch panel 22.

In step S3, the signal receiving module 202 receives touch signals on the obverse touch panel 20 and the reverse touch panel 22.

In step S4, the calculating module 203 determines a first touch number "X1" on the obverse touch panel 20 and a second touch number "Y1" on the reverse touch panel 22 according to the received touch signals. For example, if two touch points are detected on the obverse touch panel 20, X1=2. If three touch points are detected on the reverse touch panel 22, Y1=3.

In step S5, if the signal receiving module 202 does not receive any touch signal for a preset time (e.g., two seconds), the determining module 204 determines whether the first touch number "X1" is equal to the first unlocking number "X" (i.e., X1=X), and the second touch number "Y1" is equal to the second unlocking number "Y" (i.e., Y1=Y). If X1 is equal to X and Y1 is equal to Y, the procedure goes to step S6. If X1 is not equal to X or/and Y1 is not equal to Y, the procedure returns to step S2.

In step S6, the unlocking module 205 unlocks the electronic device 2. An example of unlocking the electronic device 2 using the obverse touch panel 20 and the reverse touch panel 22 is as follows.

Figure 5:
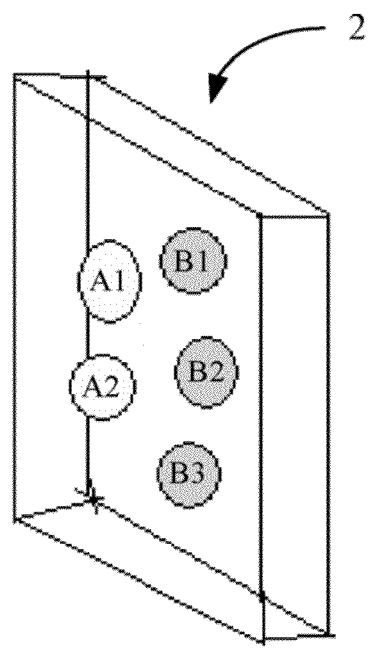
FIG. 5 is a schematic diagram of an example of obtaining touch numbers on an obverse touch panel and a reverse touch panel of the electronic device.

As shown in FIG. 5, the user touches two points (e.g., "A1" and "A2") on the obverse touch panel 20, and touches three points (e.g., "B1," "B2," and "B3") on the reverse touch panel 22, the calculating module 203 determines X1=2, Y1=3. Then, the unlocking module 205 unlocks the electronic device 2.

In other embodiments, the unlocking method of the present application can be used in the electronic device 2 which has only a single touch panel. For example, the single touch panel may be separated into two areas, such as a top area and a bottom area. Then, the unlocking system 24 may unlock the electronic device 2 by detecting touch signals on the top area and the bottom area of the single touch panel. That is to say, the top area of the single touch panel is the equivalent with the obverse touch panel 20, and the bottom area of the single touch panel is the equivalent with the reverse touch panel 22.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for unlocking an electronic device comprising a processor, the method comprising:
   receiving touch signals on a first touch panel and a second touch panel of the electronic device, wherein the touch signals on the first touch panel and the touch signals on the second touch panel are received simultaneously, the first touch panel is disposed on a side of the electronic device, the second touch panel is disposed on another side of the electronic device;
   determining a first touch number on the first touch panel and a second touch number on the second touch panel according to the received touch signals; and
   unlocking the electronic device upon the condition that the first touch number is equal to a first preset value and the second touch number is equal to a second preset value.

2. The method according to claim 1, further comprising:
   setting a first unlocking number of touch points on the first touch panel and a second unlocking number of touch points on the second touch panel, and storing the first unlocking number and the second unlocking number in a storage device of the electronic device, the first unlocking number being the first preset value, and the second unlocking number being the second preset value.

3. The method according to claim 2, wherein a maximum value of the first unlocking number is equal to a number of the maximum touch points of the first touch panel.

4. The method according to claim 2, wherein a maximum value of the second unlocking number is equal to a number of the maximum touch points of the second touch panel.

5. The method according to claim 1, wherein the first touch panel and the second touch panel are resistive touch panels or capacitive touch panels.

6. An electronic device, comprising:
   a first touch panel;
   a second touch panel;
   a storage device;
   at least one processor; and
   one or more modules that are stored in the storage device and are executed by the at least one processor, the one or more modules comprising:
     a signal receiving module that receives touch signals on the first touch panel and the second touch panel, wherein the touch signals on the first touch panel and the touch signals on the second touch panel are received simultaneously, the first touch panel is disposed on a side of the electronic device, the second touch panel is disposed on another side of the electronic device;
     a calculating module that determines a first touch number on the first touch panel and a second touch number on the second touch panel according to the received touch signals; and
     an unlocking module that unlocks the electronic device upon the condition that the first touch number is equal to a first preset value and the second touch number is equal to a second preset value.

7. The electronic device according to claim 6, wherein the one or more modules further comprise:
   a setting module that sets a first unlocking number of touch points on the first touch panel and a second unlocking number of touch points on the second touch panel, and stores the first unlocking number and the second unlocking number in the storage device, the first unlocking number being the first preset value, and the second unlocking number being the second preset value.

8. The electronic device according to claim 7, wherein a maximum value of the first unlocking number is equal to a number of the maximum touch points of the first touch panel.

9. The electronic device according to claim 7, wherein a maximum value of the second unlocking number is equal to a number of the maximum touch points of the second touch panel.

10. The electronic device according to claim 6, wherein the first touch panel and the second touch panel are resistive touch panels or capacitive touch panels.

11. A non-transitory storage medium having stored thereon instructions that, when executed by a processor of an electronic device, causes the processor to perform a method for unlocking the electronic device, the method comprising:
    receiving touch signals on a first touch panel and a second touch panel of the electronic device, wherein the touch signals on the first touch panel and the touch signals on the second touch panel are received simultaneously, the first touch panel is disposed on a side of the electronic device, the second touch panel is disposed on another side of the electronic device;
    determining a first touch number on the first touch panel and a second touch number on the second touch panel according to the received touch signals; and unlocking the electronic device upon the condition that the first touch number is equal to a first preset value and the second touch number is equal to a second preset value.

12. The non-transitory storage medium according to claim 11, wherein the method further comprises:

setting a first unlocking number of touch points on the first touch panel and a second unlocking number of touch points on the second touch panel, and storing the first unlocking number and the second unlocking number in a storage device of the electronic device, the first unlocking number being the first preset value, and the second unlocking number being the second preset value.

13. The non-transitory storage medium according to claim 12, wherein a maximum value of the first unlocking number is equal to a number of the maximum touch points of the first touch panel.

14. The non-transitory storage medium according to claim 12, wherein a maximum value of the second unlocking number is equal to a number of the maximum touch points of the second touch panel.

15. The non-transitory storage medium according to claim 11, wherein the first touch panel and the second touch panel are resistive touch panels or capacitive touch panels.

16. The non-transitory storage medium according to claim 11, wherein the medium is selected from the group consisting of a hard disk drive, a compact disc, a digital video disc, and a tape drive.

* * * * *